United States Patent
Pech et al.

(10) Patent No.: US 8,075,069 B2
(45) Date of Patent: Dec. 13, 2011

(54) DRIVE TUMBLER AND TRACK DRIVE FOR MOBILE VEHICLES, INCLUDING LIFT CRANES

(75) Inventors: David J. Pech, Manitowoc, WI (US); Joel D. Zick, Newton, WI (US)

(73) Assignee: Manitowoc Crane Companies, LLC, Manitowoc, WI (US)

( * ) Notice: Subject to any disclaimer, the term of this patent is extended or adjusted under 35 U.S.C. 154(b) by 261 days.

(21) Appl. No.: 12/368,143

(22) Filed: Feb. 9, 2009

(65) Prior Publication Data
US 2009/0200860 A1 Aug. 13, 2009

Related U.S. Application Data

(60) Provisional application No. 61/027,775, filed on Feb. 11, 2008.

(51) Int. Cl.
*B62D 55/12* (2006.01)

(52) U.S. Cl. .................................. 305/195; 305/199

(58) Field of Classification Search .................. 305/124, 305/184, 185, 193, 195, 196, 198, 199, 200, 305/201; 474/162; 74/448, 457, 460
See application file for complete search history.

(56) References Cited

U.S. PATENT DOCUMENTS

| | | | | |
|---|---|---|---|---|
| 1,494,807 | A | * | 5/1924 | Rorabeck .................. 305/199 |
| 2,579,749 | A | * | 12/1951 | Mercier .................... 432/245 |

(Continued)

FOREIGN PATENT DOCUMENTS

DE  30 36 403 A1  4/1981

(Continued)

OTHER PUBLICATIONS

Berco S.p.A., Track Chains, originally retrieved Feb. 8, 2008, from http://www.berco.com/html/ track_chains.html (2 pages).

(Continued)

*Primary Examiner* — Kip T Kotter

(74) *Attorney, Agent, or Firm* — Brinks Hofer Gilson & Lione; Steven P. Shurtz

(57) ABSTRACT

A combination of a drive tumbler and a track includes a track made of a plurality of connected track shoes and a plurality of driven surfaces. The track is wrapped around the drive tumbler so that a plurality of the shoes are in contact with the drive tumbler. The drive tumbler has a plurality of drive surfaces and a circumferential rim surface that includes a plurality of shoe contact surfaces that each contact the inside surface of one of the track shoes that are in contact with the tumbler. The shoe contact surface has a shape such that a line normal to the tangent of the shoe contact surface does not pass through the axis of rotation of the drive tumbler, thereby allowing the shoe contact surfaces on the rim of the drive tumbler to transmit a tractive force to the track. A preferred drive tumbler comprises a center hub and a plurality of individual tooth members connected to the center hub by welds.

24 Claims, 11 Drawing Sheets

U.S. PATENT DOCUMENTS

| | | | | |
|---|---|---|---|---|
| 3,168,836 A | * | 2/1965 | Militana | 474/152 |
| 3,505,892 A | * | 4/1970 | Graham | 474/160 |
| 4,116,081 A | | 9/1978 | Luttrell et al. | |
| 4,278,301 A | | 7/1981 | Gregor et al. | |
| 4,308,019 A | * | 12/1981 | Horkey et al. | 474/162 |
| 4,415,053 A | * | 11/1983 | Fulford | 180/343 |
| 4,763,961 A | | 8/1988 | Parrott | |
| 5,131,731 A | * | 7/1992 | Johnson | 305/193 |
| 5,409,306 A | * | 4/1995 | Bentz | 305/185 |
| 5,632,538 A | | 5/1997 | Wiesner et al. | |
| 6,595,603 B2 | | 7/2003 | Rutz et al. | |
| 6,659,573 B1 | * | 12/2003 | Knecht et al. | 305/195 |
| 6,851,494 B2 | | 2/2005 | Harthauser | |
| 2006/0012247 A1 | * | 1/2006 | Girard et al. | 305/199 |

FOREIGN PATENT DOCUMENTS

| | | |
|---|---|---|
| EP | 0 687 618 A1 | 12/1995 |
| FR | 2 711 959 A1 | 5/1995 |
| SU | 1037002 A * | 8/1983 |

OTHER PUBLICATIONS

CMMS Model Summary, D11T/D11T CD Track Type Tractor, retrieved Feb. 8, 2008, from http://cmms.cat.com/cmms/servlet/cat.dcs.cmms.serylet.GetModelSummary?dsfFlag=0&&... (1 page).

Terex, Demag CC8800-1 Crawler Crane literature, 2007 (pp. 1-4, 52).

* cited by examiner

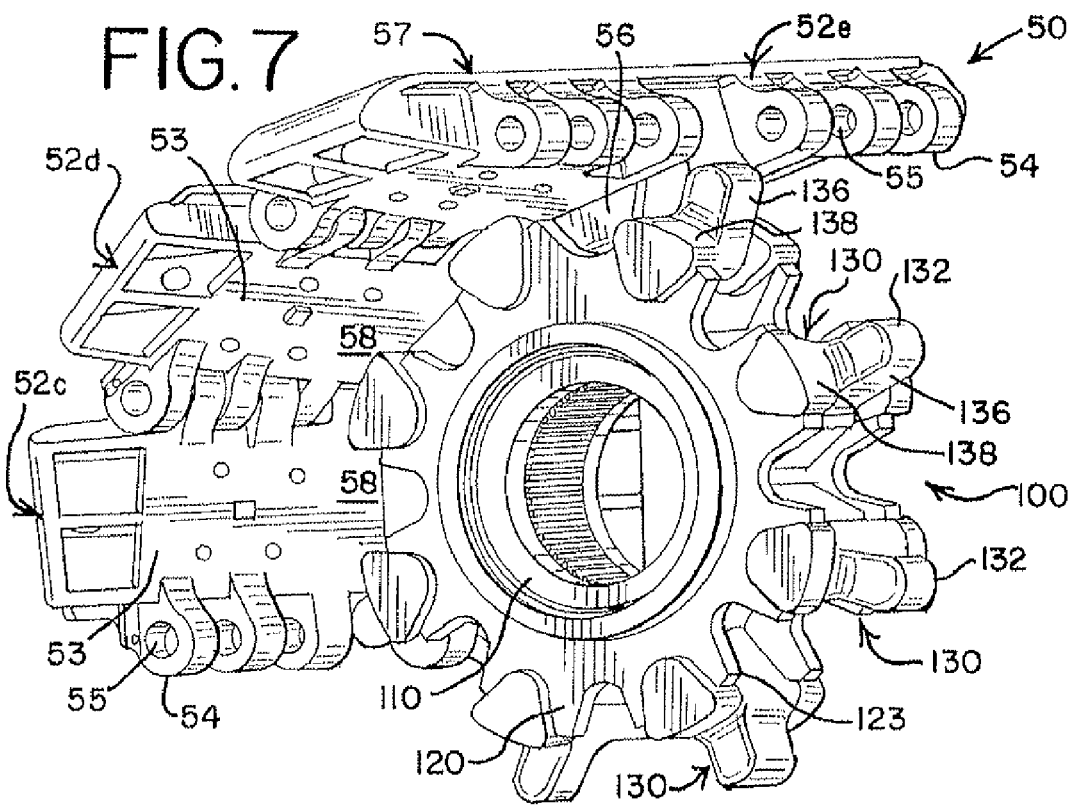
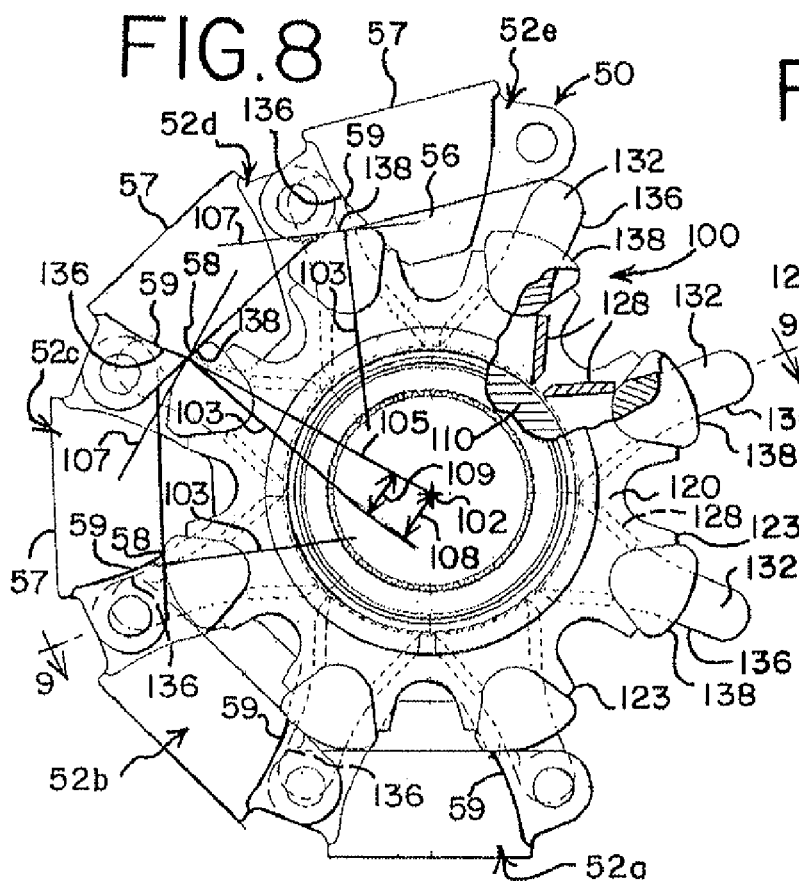
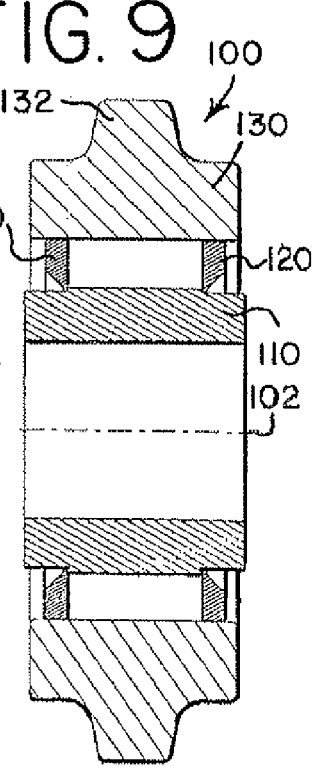

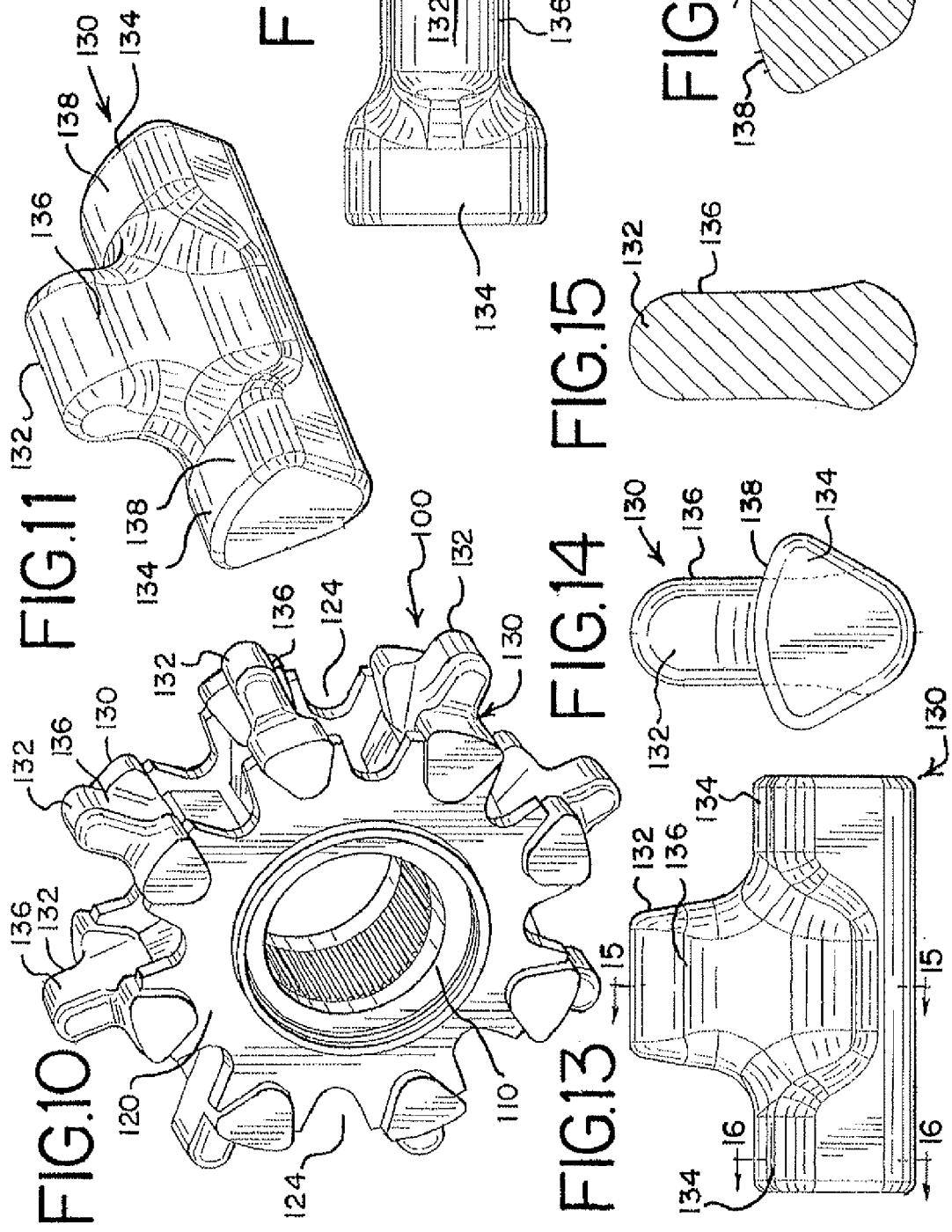

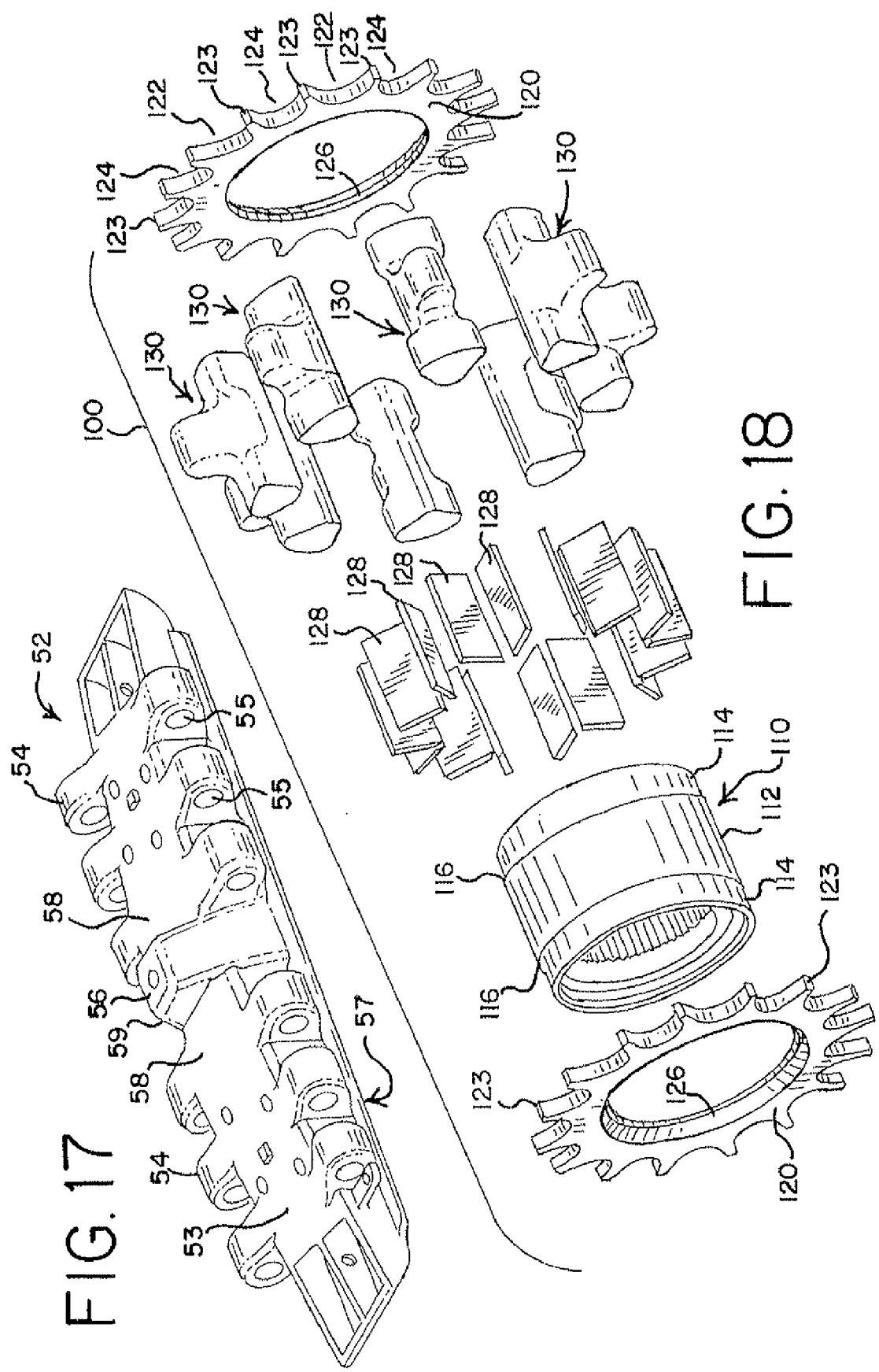

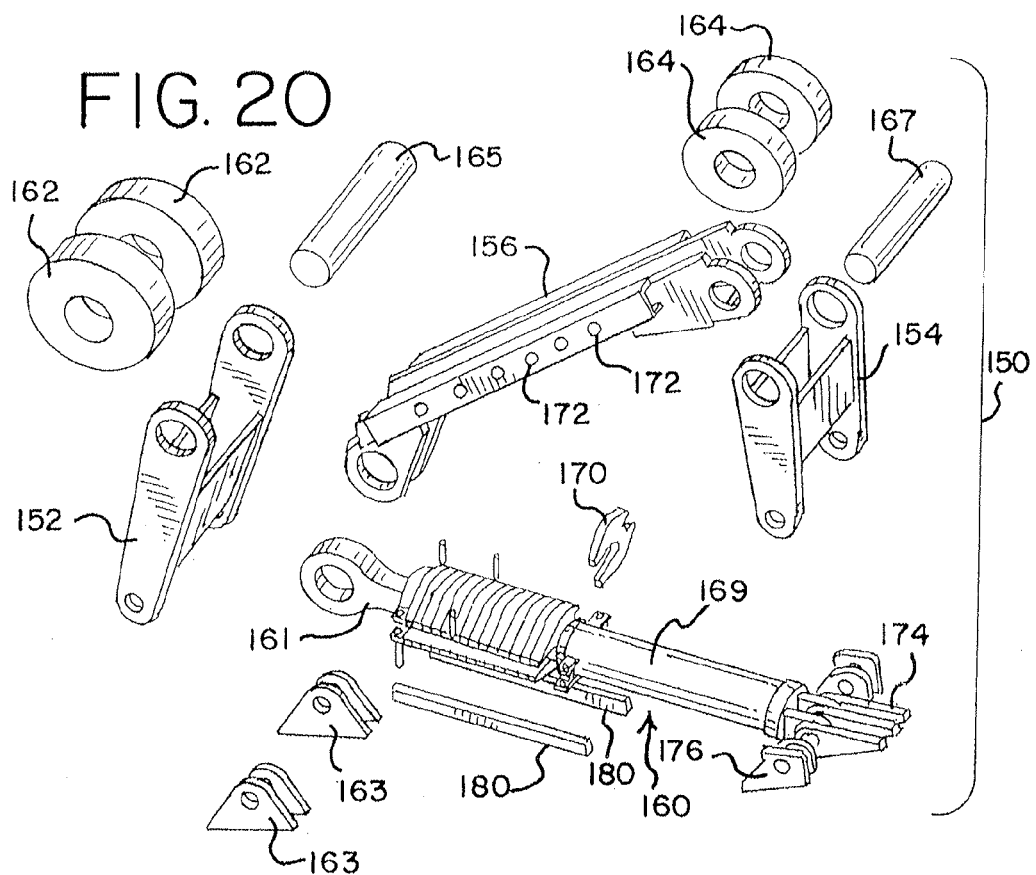
FIG. 20
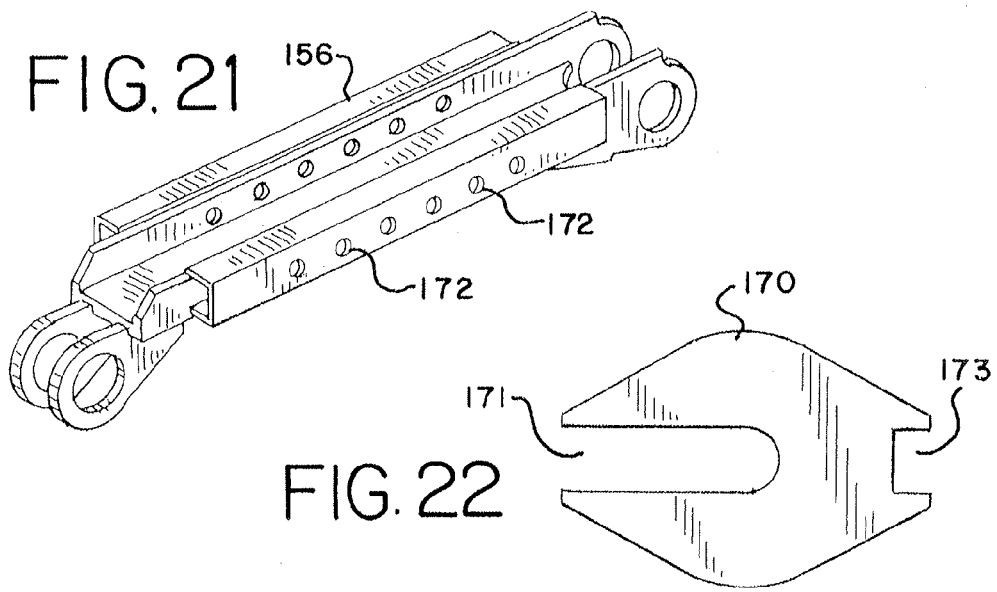
FIG. 21
FIG. 22

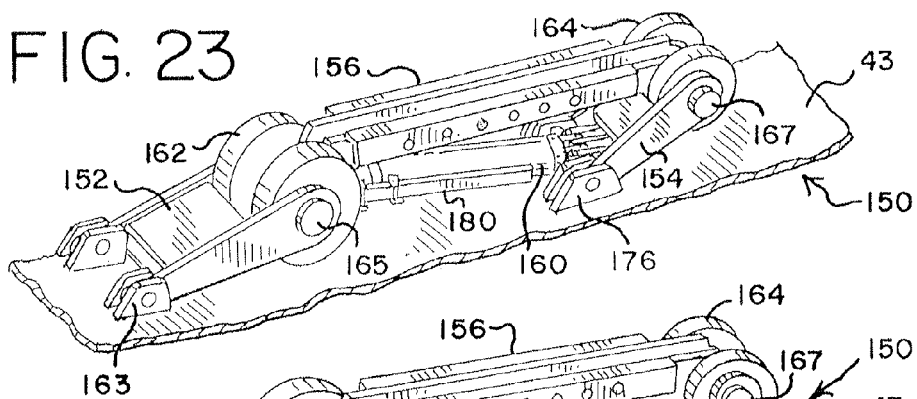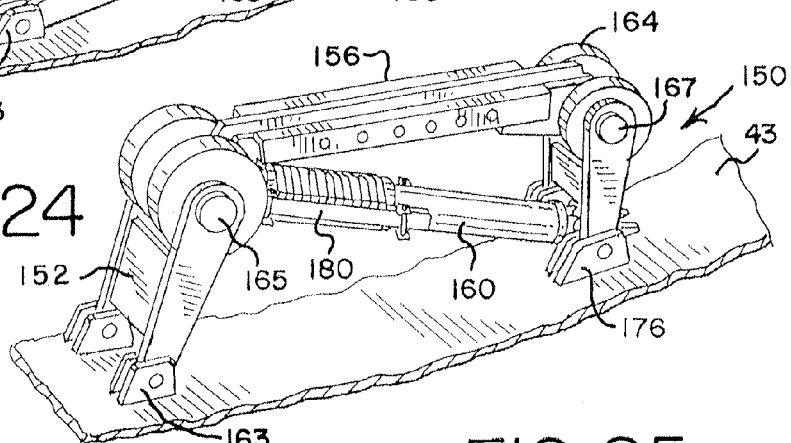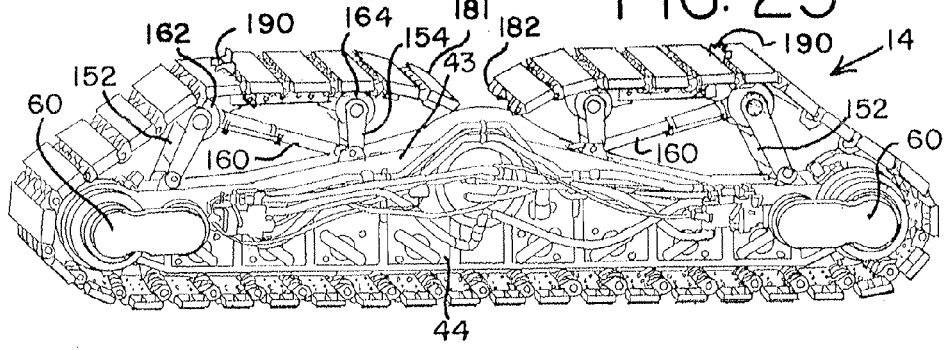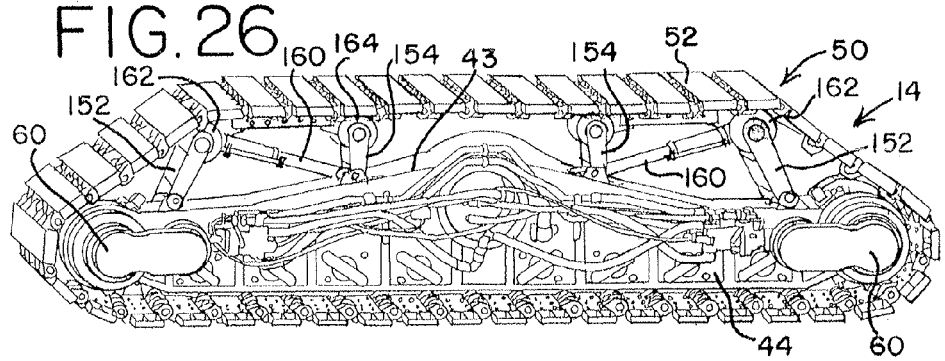

DRIVE TUMBLER AND TRACK DRIVE FOR MOBILE VEHICLES, INCLUDING LIFT CRANES

REFERENCE TO EARLIER FILED APPLICATION

The present application claims the benefit of the filing date under 35 U.S.C. §119(e) of Provisional U.S. Patent Application Ser. No. 61/027,775, filed Feb. 11, 2008; which is hereby incorporated by reference in its entirety.

BACKGROUND

The present invention relates to a drive tumbler, such as used in a vehicle crawler, and to other improvements relating to the crawler itself; vehicles (especially mobile lift cranes) using the crawlers; and methods of making and utilizing the tumbler and other crawler improvements.

Many vehicles, especially construction equipment that moves over uneven ground surfaces, use track drives to maneuver. The track drive is typically part of a crawler, which has a frame on which the endless track is mounted, along with a drive motor. A drive tumbler, also sometimes referred to as a drive sprocket, transmits torque from the drive motor to the track to generate a tractive force, which moves the crawler frame, and thus the vehicle it is a part of, relative to the portion of the track on the ground, and hence moves the vehicle relative to the ground. A track may be powered by a single tumbler, and be trained over an idler wheel also mounted to the frame, or the track may be powered by two drive tumblers. Some crawler frames mount two idler wheels at opposite ends of the frame, and include a drive tumbler elsewhere on the crawler.

In addition to straight forward movements, turning movements are also performed with a set of track drives on opposite sides of the vehicle. These turning movements require one track to turn faster than the other, or more typically, for one track to turn while the track on the other track is stationary. Sometimes the vehicle, particularly construction equipment, will need to turn in place, which can be accomplished by driving one track in one direction and the other track in the opposite direction.

The crawler frame may be a permanent part of the vehicle frame, or in the case of large vehicles that cannot be transported over the highway as a single unit, such as large mobile lift cranes, the crawler is connected to the rest of the vehicle in a manner that the entire crawler, including the crawler frame, track and drive tumbler, is disconnected from the remainder of the vehicle. For some large crawlers, even this disengaged unit will exceed highway transportation weight limits. In that case, the track may need to be removed from the frame to provide individual transport loads within highway weight limits.

The size of the individual components of the crawler is a function of the loads that will be imposed on the crawler, both loads resulting from the weight of the vehicle and any load carried by the vehicle, and loads required to achieve desired vehicle movement, and how those loads are dealt with in the arrangement of the crawler parts. For example, with a track that is made of individual track shoes connected together, which have a driven surface that engages a drive surface on the tumbler, the drive and driven surfaces are part of structures (such as teeth or lugs) that must be large enough to carry the compressive loads required to transmit the torque from the tumbler to the track. Especially with cutting maneuvers (when a crane is changing direction), the amount of tractive force that must be transmitted to the track by the tumbler is very large. If teeth on the tumbler engage lugs on the track shoes, both the teeth and the lugs must be sized to carry the force between the tumbler and the track shoes to produce this tractive effort.

Using conventional tumbler designs, the teeth on the tumbler and the lug on each shoe must carry the entire tractive force. The material costs and weight for using large teeth is multiplied by the number of teeth on the tumbler. More significantly, increased lug sizes are replicated on the lug of every track shoe. There may be as many as 50 or more shoes making up a track. The increased weight is a problem for operation (requiring larger engines and more fuel to operate the equipment) and for transportation between job sites. Therefore a track and tumbler design that could generate the same amount of tractive force with less material weight for the component parts would be a great improvement. Also, for very large tumblers, perhaps weighing 2000 pounds or more, casting the tumbler becomes a challenge, and there are relatively few facilities that can even cast something that large.

As noted above, it is often required on large crawlers to remove the track from the crawler frame in order to get separate loads that are within highway weight limits. This requires that the track be disconnected so that it can be removed from the crawler frame, and then reinstalled on the crawler frame and reconnected at the new job site. Previous methods of reconnecting the ends of the track have proven to be time consuming. With large cranes, and heavy tracks, the reconnection of the track ends may be a daunting task. Also, once the track is replaced on the frame and reconnected, the tension in the track needs to be established for proper track operation. Also, even if the track is never removed, wear in the track elements over time will result in an effective greater length for the track. While individual track shoes may be removed when the track gets too long, it is important to be able to set the correct tension in the track for the varying lengths of the track.

When the track is entrained about one drive tumbler and one idler wheel at opposite ends of the crawler frame, it has been conventional to make the idler wheel position adjustable relative the rest of the crawler frame to achieve correct track tension. This type of tensioning system may work when the only loads on the adjustability structure are compressive loads, since the idler wheel only transmits compressive loads to the frame. However, if both ends of the crawler frame are equipped with a drive tumbler, then bending loads are carried through the frame as the drive tumbler transmits torque to the track. These bending loads make an adjustable connection of the drive tumbler to the frame, so that the drive tumbler can move horizontally with respect to the rest of the frame to create proper track tension, a complicated structure.

BRIEF SUMMARY

The present invention involves several different aspects, all producing different benefits to crawlers. A tumbler design has been invented that allows the torque to be transmitted though the tumbler rim to the track shoes, as well as through a drive tooth that engages a lug on the track shoe. As a result, the weight of the teeth on the tumbler, and the weight of the individual track shoes, can be significantly reduced. Second, a tumbler design has been invented that is constructed by making individual components of the tumbler, such as a center hub and a plurality of tooth members, and then welding the tumbler parts together. Third, a track connection system has been invented that aids in connecting the ends of the track when the track is being installed around the crawler frame.

Also, a track tensioning system has been invented, which makes it easy for the correct tension to be established in the track.

In a first aspect, the invention is a combination of a drive tumbler and a track made of a plurality of connected track shoes each having a ground engaging surface and an inside surface opposite the ground engaging surface, the track further having a plurality of driven surfaces, the track being wrapped around the drive tumbler so that a plurality of the shoes are in contact with the drive tumbler. The drive tumbler has an axis of rotation and comprises i) a plurality of drive surfaces, at least one of which engages one of the driven surface on the track; and ii) a circumferential rim surface that includes a plurality of shoe contact surfaces that each contact the inside surface of one of the track shoes that are in contact with the tumbler. The shoe contact surface has a shape such that a line normal to the tangent of the shoe contact surface does not pass through the axis of rotation of the drive tumbler, thereby allowing the shoe contact surfaces on the rim of the drive tumbler to transmit a tractive force to the track.

In a second aspect, the invention is a method of transmitting force between a drive tumbler and a track. The track is made from a plurality of connected track shoes each having a ground engaging surface, an inside surface opposite the ground engaging surface and a driven surface, the track being wrapped around the drive tumbler so that a plurality of the shoes are in contact with the drive tumbler. The drive tumbler has an axis of rotation, a plurality of drive surfaces, at least one of which engages the driven surface on one of the track shoes that are in contact with the tumbler, and a circumferential rim surface that includes a plurality of shoe contact surfaces that each contact the inside surface of one of the track shoes that are in contact with the tumbler. The shoe contact surfaces each have a shape such that a line normal to the tangent of the shoe contact surface does not pass through the axis of rotation of the drive tumbler. Torque is applied through the drive tumbler to the track through both the driven surface on one of the track shoes and the inside surfaces of the shoes. The torque applied by the drive tumbler shoe contact surfaces on the rim of the tumbler has a moment arm about which to generate force on the track from the contact of the shoe contact surfaces on the rim.

In a third aspect, the invention is a drive tumbler for a track vehicle comprising a center hub having an axis of rotation; and a plurality of individual tooth members connected to the center hub by welds.

In a fourth aspect, the invention is a method of making a drive tumbler for a track vehicle comprising: providing a center hub and a plurality of individual tooth members; and connecting the individual tooth members to the center hub by welds to produce said drive tumbler, with teeth extending radially outward around the perimeter of the drive tumbler.

Because the tumbler is designed with shoe contact surfaces on its rim through which torque can be transmitted to the shoes of the track, the amount of torque transmitted by the teeth to the track is reduced. As a result, the lug member on each track shoe can be reduced in size. The shoes cost less in material, and reduce the weight of the track, which reduces operating costs as well as transport costs.

The design of the preferred tumbler, made with separately cast tooth members and center hub, makes it easier to manufacture the tumbler, as the individual parts that are cast are much smaller. Also, a fixture can then be used to hold the tooth members in the correct orientation with respect to one another while the tumbler is fabricated, resulting in tighter tolerances on the finished tumbler. Also, more manufacturing flexibility is achieved because the tumbler parts can be made at many more facilities that the relatively few that could cast one large tumbler.

These and other advantages of the invention, as well as the invention itself, will be more easily understood in view of the attached drawings.

BRIEF DESCRIPTION OF THE DRAWINGS

FIG. 7 is a side perspective view of one tumbler with an associated portion of the track of the crawler of FIG. 5, with the drive motor and gear assembly removed for sake of clarity.

FIG. 8 is a side elevational view of the tumbler and track section of FIG. 7.

FIG. 9 is a cross-sectional view of one of the tumblers used on the crawler of FIG. 5.

FIG. 10 is a side perspective view of the tumbler of FIG. 9.

FIG. 11 is a perspective view of one tooth member used in the tumbler of FIG. 10.

FIG. 12 is a top plan view of the tooth member of FIG. 11.

FIG. 13 is a side elevational view of the tooth member of FIG. 11.

FIG. 14 is an end elevational view of the tooth member of FIG. 11.

FIG. 15 is a cross-sectional view taken along line 15-15 of FIG. 13.

FIG. 16 is a cross-sectional view taken along line 16-16 of FIG. 13.

FIG. 17 is a perspective view of one track shoe used on the crawler of FIG. 5.

FIG. 18 is an exploded view of the tumbler of FIG. 10.

FIG. 20 is an exploded view of a track tensioning system used on the crawler of FIG. 5.

FIG. 21 is perspective view of a link used in the track tensioning system of FIG. 20.

FIG. 22 is plan view of a shim used in the track tensioning system of FIG. 20.

FIG. 23 is perspective view of the track tensioning system of FIG. 20 in a retracted position.

FIG. 24 is perspective view of the track tensioning system of FIG. 20 in an extended position.

FIG. 25 is a side perspective view of the crawler of FIG. 5 showing the track being installed on the crawler.

FIG. 26 is a side perspective view of the crawler of FIG. 5 with the track installed and fully tensioned.

DETAILED DESCRIPTION OF THE DRAWINGS AND THE PRESENTLY PREFERRED EMBODIMENTS

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Several terms used in the specification and claims have a meaning defined as follows.

The "bottom" of the crawler frame is defined as the portion of the crawler frame that is designed to transmit the weight of the crawler, and the weight of any vehicle to which it is attached, and any load supported by that vehicle, to the ground. Typically the bottom of the crawler frame will be outfitted with a set of rollers that allow the frame to move along the track as the track lies on the ground. The preferred crawler frame also has a top, front and rear. The top of the frame is opposite the bottom of the frame. The terms "front" and "rear" (or modifications thereof such as "rearward") referring to the crawler frame, or other parts of the crawler connected thereto, such as the tumblers, are taken from the perspective of the front of the vehicle to which the crawler is attached. In a lift crane, where the crawlers are attached to a carbody that is rotatably connected to an upper works, and where a boom is mounted on the front of the crane, the carbody is typically designed with a portion that is considered to be the "front", which is intended to be the portion in front when the crane moves in the direction the boom is mounted on.

The tumbler, combination track and tumbler, track tensioning and track connection aspects of the present invention are particularly useful on a crawler used on a lift crane. While the invention will have applicability to crawlers used on other vehicles, it will be described in connection with lift crane 10, shown in FIGS. 1-2. The mobile lift crane 10 includes lower works, also referred to as a carbody 12, and moveable ground engaging members in the form of crawlers 14 and 16. There are of course two front crawlers 14 and two rear crawlers 16, only one each of which can be seen from the side view of FIG. 1. The other set of crawlers can be seen in the perspective view of FIG. 2. In the crane 10, the ground engaging members could be just one set of crawlers, one crawler on each side. Of course additional crawlers than those shown can be used.

Figure 2:
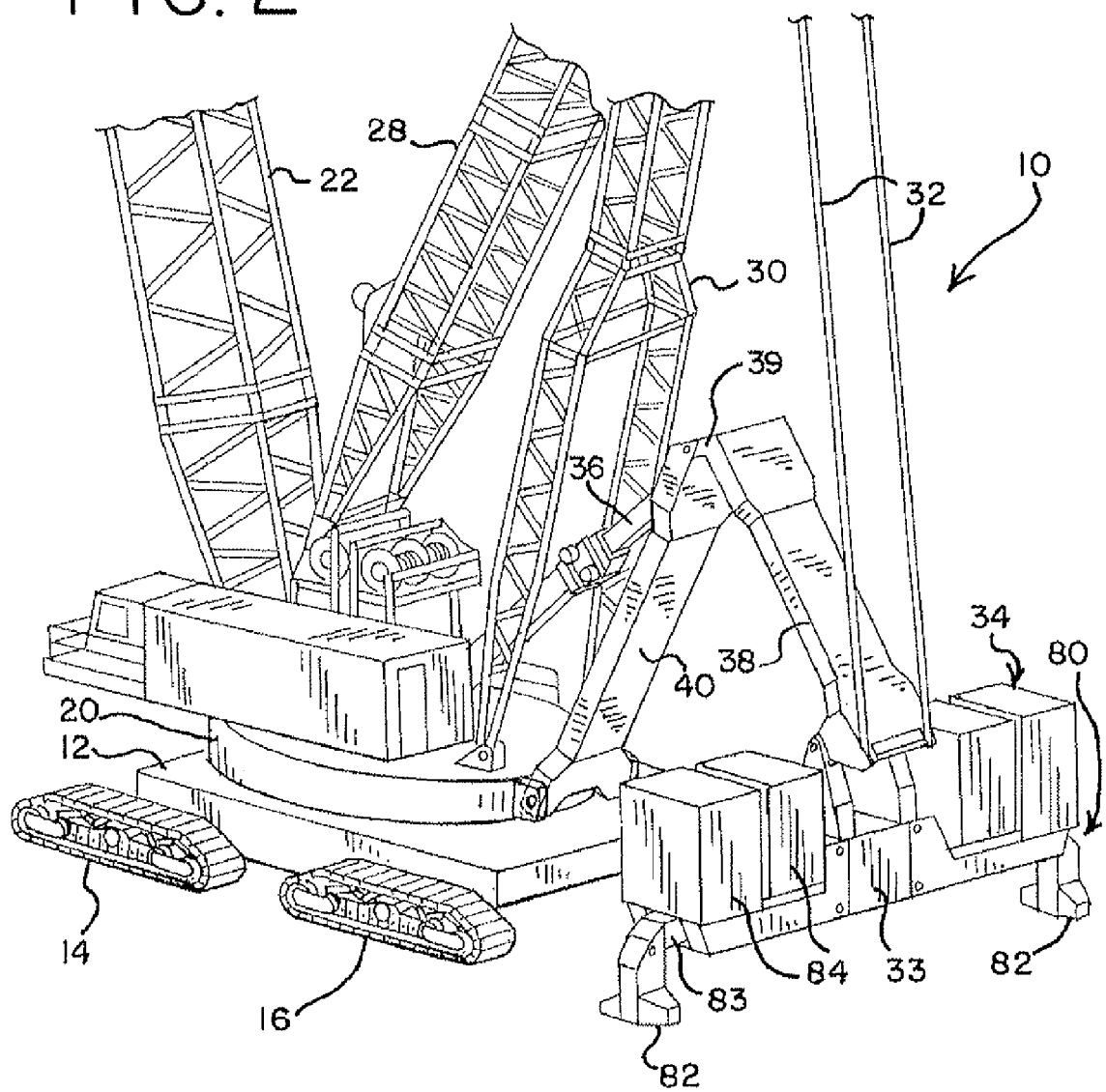
FIG. 2 is a rear perspective view of the crane of FIG. 1.

A rotating bed 20 is rotatably connected to the carbody 12 such that the rotating bed can swing with respect to the ground engaging members. The rotating bed is mounted to the carbody 12 with a stewing ring, such that the rotating bed 20 can swing about an axis with respect to the ground engaging members 14, 16. The rotating bed supports a boom 22 pivotally mounted on a front portion of the rotating bed; a mast 28 mounted at its first end on the rotating bed; a backhitch 30 connected between the mast and a rear portion of the rotating bed; and a movable counterweight unit 34 having counterweights 84 on a support member 33. The counterweights may be in the form of multiple stacks of individual counterweight members on the support member 33. (FIG. 2 is simplified for sake of clarity, and does not show the full lengths of the boom, mast, and backhitch.)

Figure 1:
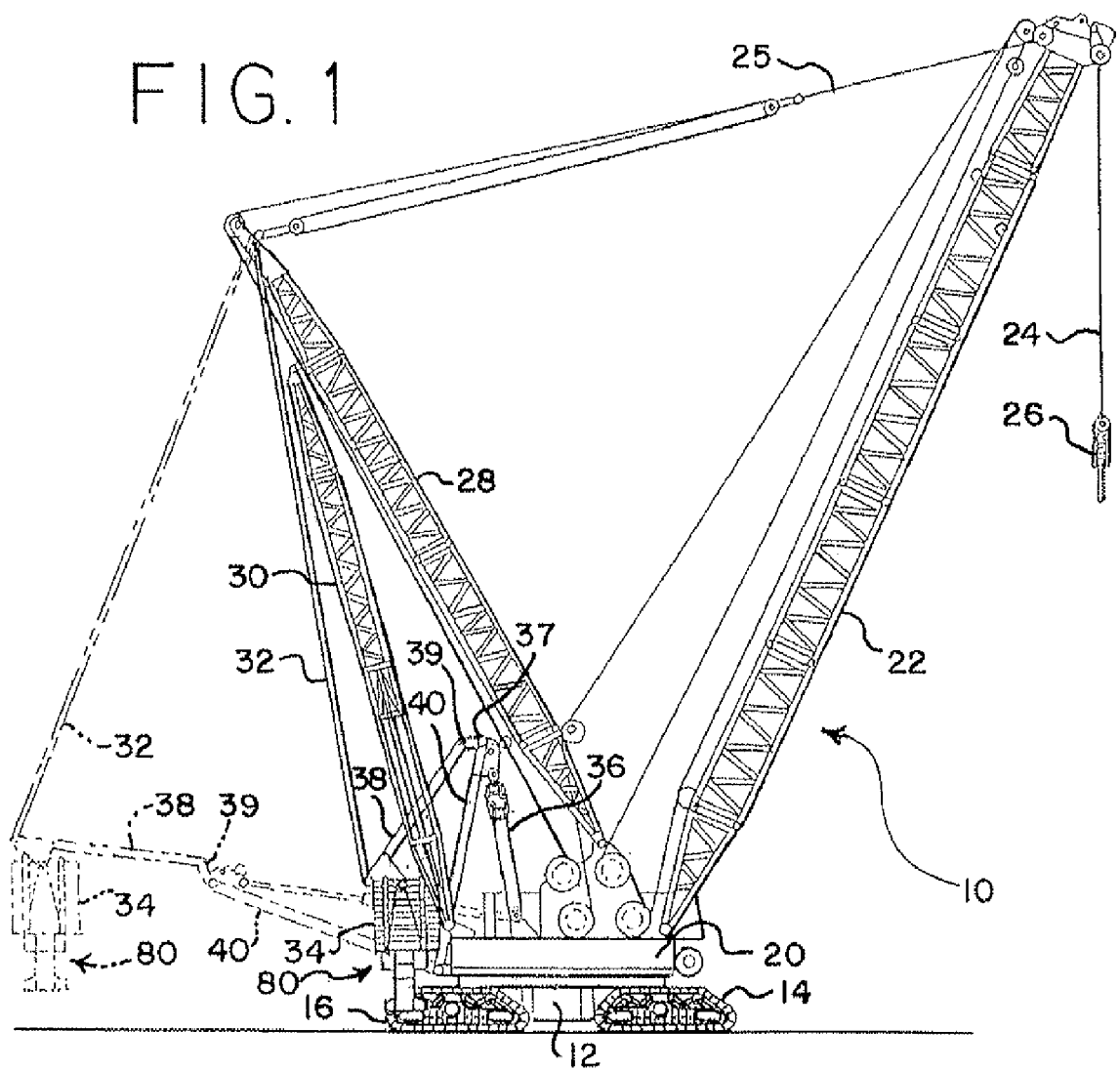
FIG. 1 is a side elevational view of a mobile lift crane with crawlers utilizing the present invention.

Boom hoist rigging 25 between the top of mast 28 and boom 22 is used to control the boom angle and transfers load so that the counterweight can be used to balance a load lifted by the crane. A hoist line 24 extends from the boom 22, supporting a hook 26. The rotating bed 20 may also includes other elements commonly found on a mobile lift crane, such as an operator's cab and hoist drums for the rigging 25 and hoist line 24. If desired, the boom 22 may comprise a luffing jib pivotally mounted to the top of the main boom, or other boom configurations. The backhitch 30 is connected adjacent the top of the mast 28, but down the mast far enough that it does not interfere with other items connected to the mast. The backhitch 30 may comprise a lattice member designed to carry both compression and tension loads as shown in FIG. 1. In the crane 10, the mast is held at a fixed angle with respect to the rotating bed during crane operations, such as a pick, move and set operation.

The counterweight unit is movable with respect to the rest of the rotating bed 20. A tension member 32 connected adjacent the top of the mast supports the counterweight unit in a suspended mode. A counterweight movement structure is connected between the rotating bed and the counterweight unit such that the counterweight unit may be moved to and held at a first position in front of the top of the mast, and moved to and held at a second position rearward of the top of the mast.

At least one linear actuation device, in this embodiment a rack and pinion assembly 36, and at least one arm pivotally connected at a first end to the rotating bed and at a second end to the a rack and pinion assembly 36, are used in the counterweight movement structure of crane 10 to change the position of the counterweight. The arm and a rack and pinion assembly 36 are connected between the rotating bed and the counterweight unit such that extension and retraction of the rack and pinion assembly 36 changes the position of the counterweight unit compared to the rotating bed. While FIG. 1 shows the counterweight unit in its most forward position in solid lines and at its furthest back position in dotted lines, FIG. 2 shows the rack and pinion assembly 36 partially extended, which moves the counterweight unit to a mid position, such as when a load is suspended from the hook 26.

The pivot frame 40, a solid welded plate structure, is connected between the rotating bed 20 and the second end of the rack and pinion assembly 36. The rear arm 38 is connected between the pivot frame 40 and the counterweight unit. A set of pins 37 are used to connect the rear arm 38 and the pivot frame 40. The rear arm 38 is also a welded plate structure with an angled portion 39 at the end that connects to the pivot frame 40. This allows the arm 38 to connect directly in line with the pivot frame 40.

The crane 10 is equipped with a counterweight support system 80, which may be required to comply with crane regulations in some countries. Because the counterweight unit 34 can move far forward with respect to the front of the rotating bed, the counterweight supports on the support system may interfere with swing operations unless they are sufficiently spaced apart. However, this makes the support structure itself very wide. The crane 10 thus uses a counterweight support structure attached to the counterweight unit that includes a telescoping counterweight support system.

The counterweight support system 80 includes at least two ground engaging members in the form of support feet 82 that can provide support to the counterweight in the event of a sudden release of the load. The support system comprising a telescoping structure 83 connected to and between the ground engaging members 82 such that the distance between the ground engaging members 82 can be adjusted. The counterweight unit 34 is constructed so that the counterweight support system 80 can be removed and the crane can function both with and without it.

The counterweight movement structure and counterweight support structure are more fully disclosed in U.S. patent application Ser. No. 12/023,902, entitled "Mobile Lift Crane With Variable Position Counterweight," filed Jan. 31, 2008; incorporated herein by reference. The preferred embodiment of the present invention relates to a high capacity mobile lift crane, other aspects of which are disclosed in the following co-pending U.S. patent applications assigned to the assignee of the present application: "Mobile Lift Crane With Variable Position Counterweight," Ser. No. 11/733,104, filed Apr. 9, 2007; "Mast Raising Structure And Process For High-Capacity Mobile Lift Crane," Ser. No. 11/740,726, filed Apr. 26, 2007; "Drive Tumbler, Track Drive, And Track Connection And Tensioning System," Ser. No. 61/027,755 filed Feb. 11, 2008; "Boom Hoist Transportation System And Crane Using Same," Ser. No. 61/098,632 filed Sep. 19, 2008; "Trunnion Transportation System, Carbody Connection System And Crane Using Same", Ser. No. 61/099,098, filed Sep. 22, 2008; and "Connection System For Crane Boom Segments", Ser. No. 12/273,310, filed Nov. 18, 2008. Each of these applications is hereby incorporated by reference.

Figure 3:
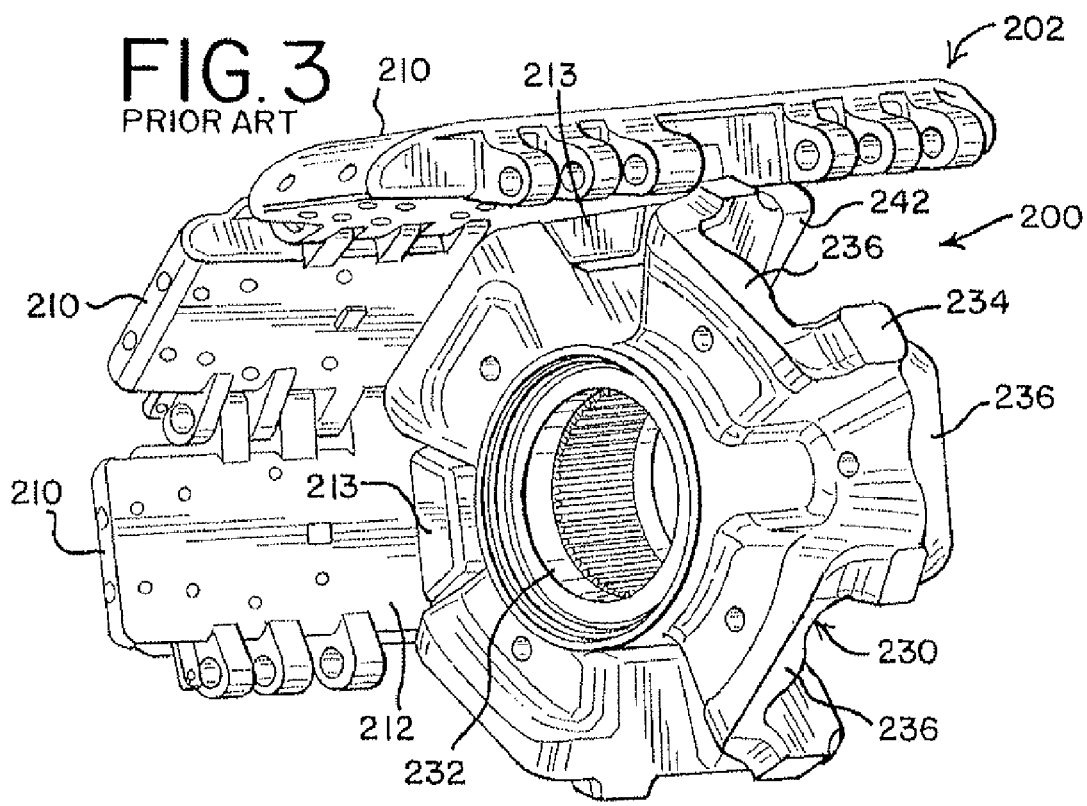
FIG. 3 is a perspective view of a portion of a tumbler and track combination of the prior art.
Figure 4:
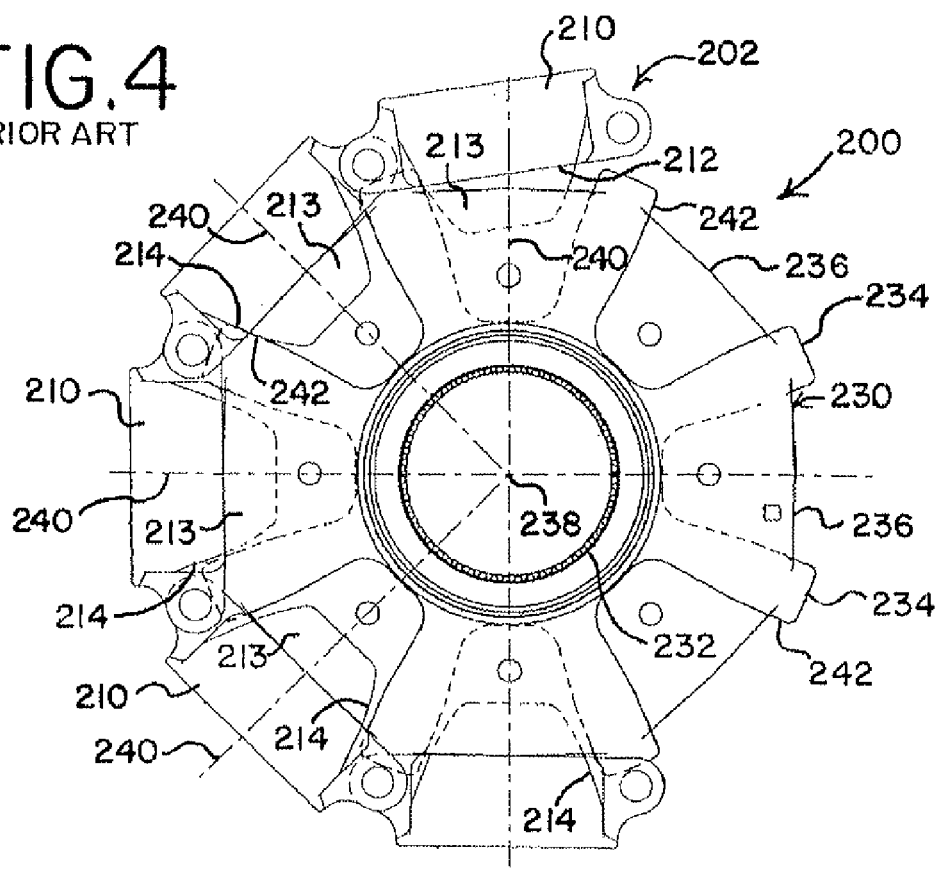
FIG. 4 is side elevational view of the prior art tumbler and track combination of FIG. 3.

To better understand the invention, it is worthwhile to first consider a prior art combination track and tumbler 200 shown in FIGS. 3 and 4. These figures represent a track and tumbler used on a crawler on a Manitowoc Model 18000 crane. The track 202 is made up of multiple track shoes 210 connected together by pins through lugs on the shoes 210, as is conventional. Each shoe 210 includes a lug 213, which includes a driven surface 214. The tumbler 230 uses an offset web pattern. The tumbler has traditionally been cast from steel as a complete unit, and then the bore is machined as necessary for seals and torque transmission.

With the tumbler 230, and other tumblers historically used on lift crane crawlers, the tractive effort drive force is generated at the interface of the lug 213 on the track shoe 210 and the drive surface 242 on the tooth 234 on the tumbler. Although several track shoes are engaged with the tumbler, the tractive effort forces are generally transmitted through one track shoe lug 213 and one tumbler tooth 234. This single lug and tooth contact is a result of the large tolerances of "as cast" components.

The tumbler rim 236 supports the track shoes 210 as they pass around the tumbler 230. The rim 236 engages the inside surface 212 of the track shoe. The shape of the rim is such that a line 240 normal to the surface (perpendicular to the tangent line of the surface) of the rim 236 at the contact with the inside shoe surface 212 passes through the axis of rotation 238 of the tumbler 230. As a result, other than small frictional forces, no torque is transmitted at these contact points. Thus, as noted, the tooth 234 and lug 213 have to be sized to be able to transmit nearly all of the force providing the tractive effort.

The offset web design of tumbler 230 provides openings for dirt, mud, small rocks and other material commonly on the ground surface at a construction site to pass out as a tumbler tooth engages a track shoe. However, because of the offset web design, the track shoe is supported on only one side of the lug 213.

Figure 5:
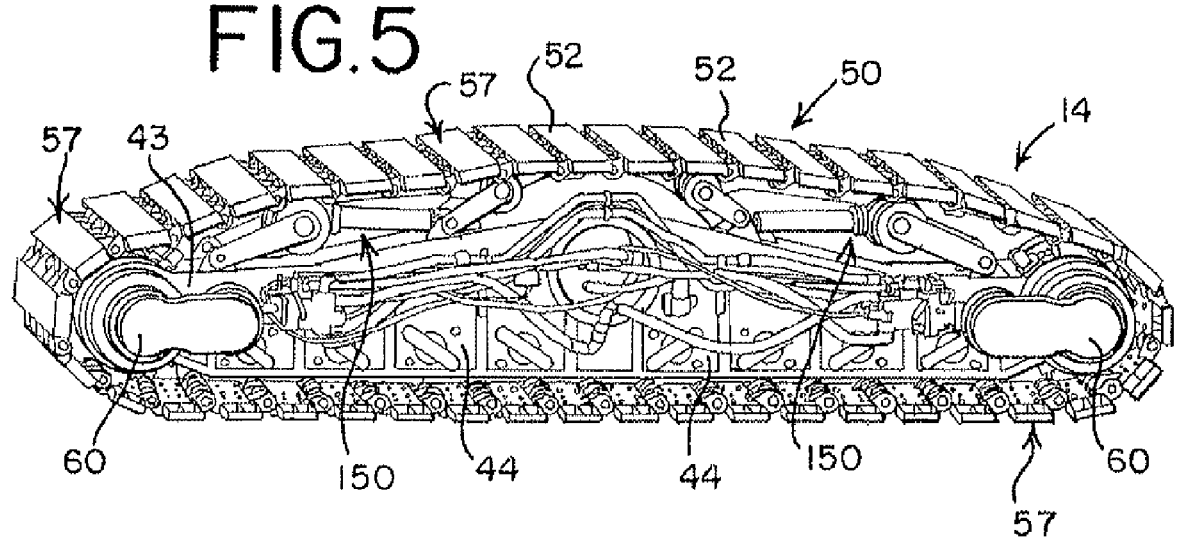
FIG. 5 is a side perspective view of a crawler used on the crane of FIGS. 1 and 2, incorporating the tumbler, tumbler and track combination, and the track tensioning and connection systems, of the present invention.
Figure 6:
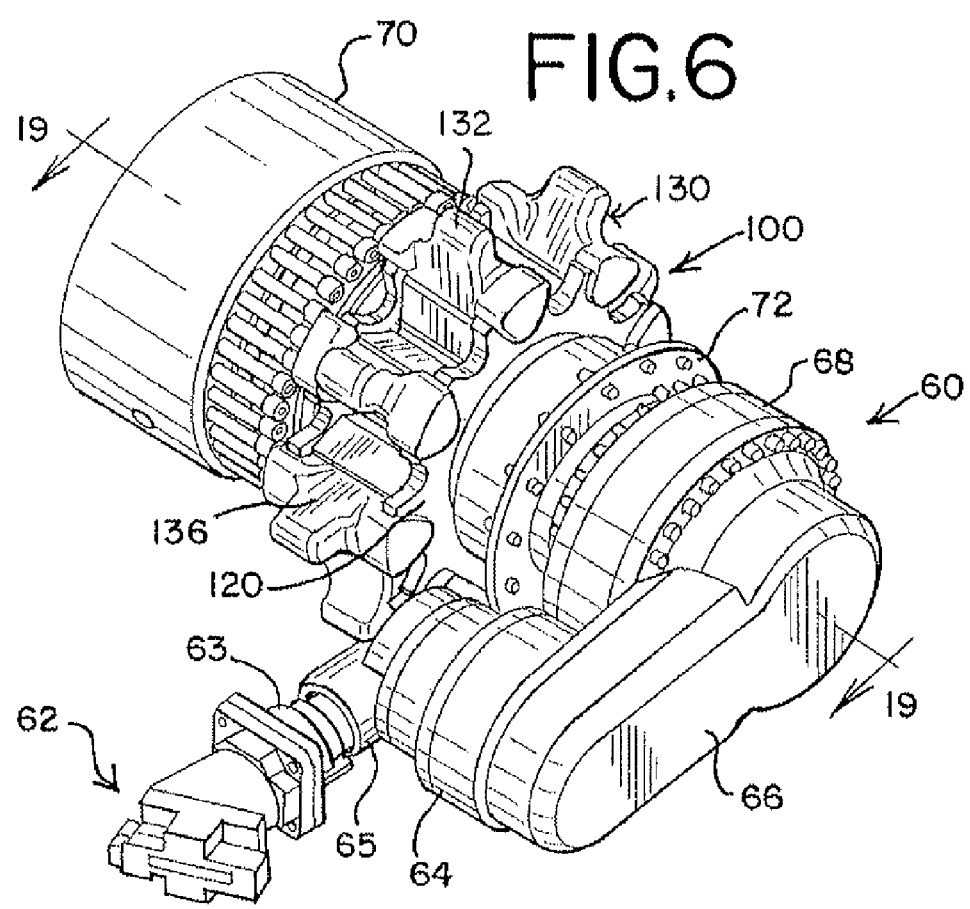
FIG. 6 is a side perspective view of a motor and gear arrangement for driving a tumbler, used in the crawler of FIG. 5.

The crawlers 14 and 16 of crane 10, best seen in FIG. 5, are equipped with two drive assemblies 60, best shown in FIG. 6. Of course the present invention may be made with a crawler having one drive assembly 60 and an idler roller at the opposite end of the crawler frame 43. The bottom of the crawler frame 43 is outfitted with a set of rollers 44 that allow the frame to move along the track as the track lies on the ground.

Figure 19:
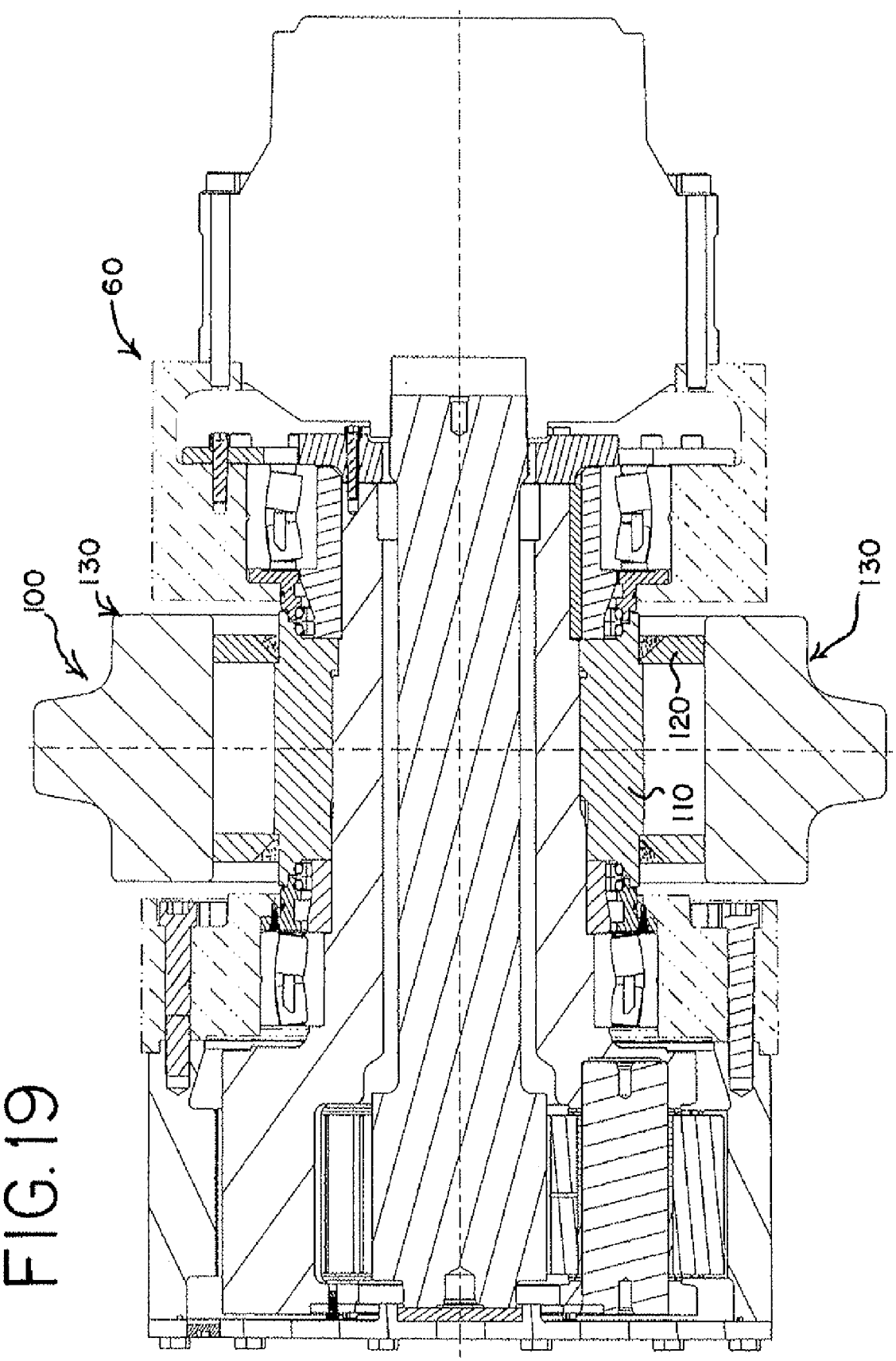
FIG. 19 is a cross-sectional view taken along line 19-19 of FIG. 6.

Each drive assembly 60 includes a variable displacement hydraulic motor 62, a spring set, hydraulic release brake 63, a right-angle gear input 65, an input planetary gear 64, a spur gear set 66, a planetary gear set 68, and a final drive planetary gear 70, all driving the improved tumbler 100 of the present invention. FIG. 19 shows a cross section of the various portions of the planetary gear elements used to drive the tumbler 100 in the drive assembly 60. A flange 72 is used to bolt the drive assembly 60 to the crawler frame 43.

The track 50 used on crawler 14 is made of a plurality of connected track shoes 52 to make an endless track having a ground engaging surface and an inside surface opposite the ground engaging surface. Each shoe likewise has a ground engaging surface 57 and an inside surface 53 (FIG. 7) opposite the ground engaging surface. The shoes 52 are connected together by pins (not shown) through holes 55 formed in multiple ears 54 on each shoe 52. The track 50 is wrapped around the drive tumbler 100 so that a plurality of the shoes 52a, 52b, 52c and 52d are in contact with the drive tumbler. Shoe 52e is shown in FIGS. 7 and 8 as just leaving contact with the tumbler 100. The track has a plurality of driven surfaces, provided is this case by driven surfaces on each of the track shoes comprised at least in part by a lug 56 extending inwardly from the inside surface of the track shoe. The driven surface 59 is on the back side of the shoe 52 shown in FIG. 17 when the track is being driven in a clockwise direction from the perspective of FIG. 8. However, of course the shoe 52 is designed so that the opposite side of the lug 56 also has a driven surface when the tumbler 100 is operated to drive the track 50 in the opposite direction.

As best seen in FIGS. 7-9, the drive tumbler 100 has an axis of rotation 102 and includes a plurality of drive surfaces, at least one of which engages one of the driven surfaces on the track, and a circumferential rim surface that includes a plurality of shoe contact surfaces that each contact the inside surface of one of the track shoes that are in contact with the tumbler. Preferably the plurality of drive surfaces are provided by drive teeth 132 extending outwardly around the periphery of the drive tumbler 100. The drive tumbler also includes a circumferential rim comprising two shoulders, one on each side of the drive teeth 132, each shoulder comprising the set of shoe contact surfaces 138. In the preferred embodiment, the rim is made up of discontinuous, individual sections of the tumbler 100. The shoe contact surfaces have a shape such that a line 103 normal to the tangent 107 of the shoe contact surface does not pass through the axis of rotation of the drive tumbler. Instead, the surfaces have a moment arm 108 though which torque can be transmitted from the tumbler directly to shoe contact surfaces 58 on the inside of the track shoes, thereby allowing the shoe contact surfaces on the rim of the drive tumbler to transmit a tractive force to the track 50.

The shoe contact surfaces on the drive tumbler rim are each shaped such that the line 103 normal to the tangent of the shoe contact surface and a radius 105 from the shoe contact surface to the axis of rotation 102 intersect at an angle 109 preferably of between about 5° and about 18°, more preferably of between about 10° and about 15°. In a preferred embodiment, the line 103 normal to the tangent of the shoe contact surface and a radius 105 from the shoe contact surface to the axis of rotation intersect at an angle 109 of about 13°.

The present invention thus includes a method of transmitting force between a drive tumbler and a track by applying torque through the drive tumbler to the track through both the driven surface on one of the track shoes and the shoe contact surfaces on the rim. The torque applied by the drive tumbler has a moment arm about which to generate force on the track from the contact of the shoe contact surfaces on the rim.

Disregarding friction and the small forces that may be produced by such friction, the preferred ratio of i) the force generated by the contact of the drive surface with the driven surface and ii) the force generated by the contact of the shoe contact surfaces on the rim and the inside surfaces of the track shoes is less than 3:1. This means that at least 25% of the force needed to drive the track will be transmitted though the shoe contact surfaces on the rim. It should be remembered that several of the shoes are each in contact with the rim of the tumbler, and thus have tractive forces transmitted though each shoe, whereas typically only one shoe at a time will be in contact with the drive teeth on the tumbler. For example, as seen in FIG. 8, shoe 52e is just leaving contact with the tumbler, and no tractive forces are transmitted by the tumbler through shoe 52e. Being driven in a clockwise direction, tooth 132 will engage lug 56 of shoe 52d. This shoe is also subject to a tractive force applied by the torque at the rim of the tumbler through moment arm 108. The next shoe, 52c, will generally not be in contact with the tooth on the tumbler, but the shoe contact surface at the tumbler rim will apply tractive effort force to shoe 52c. Likewise shoe 52b is driven on the rim, but not by tooth 132, which does not engage surface 59. It is the summation of all of the rim driving forces that will preferably provide at least 25% of the total driving forces applied by the tumbler 100 to the track 50. In preferred embodiments, the ratio of i) the force generated by the contact of the drive surface with the driven surface and ii) the force generated by the contact of the shoe contact surfaces on the rim and the inside surfaces of the track shoes is less than 2:1, and more preferably less than 1:1, and even less than 4:5. In a preferred design, disregarding friction, the shape of the rim will be such that about 60% of the tractive force applied to the track by the tumbler will be through the rim engagement with the inside surfaces 58 of the track shoes 52, and about 40% of the force will be transmitted by the tooth 132 engaging driven surface 59 on the track shoe lug 56.

The tumbler 100 preferably is made of a center hub 110 and a plurality of individual tooth members 130 connected to the center hub by welds. An exploded view of the parts used to make tumbler 100 are shown in FIG. 18. In addition to the center hub 110 and tooth members 130, the preferred drive tumbler 100 further comprises two web plates 120; and a plurality of support plates 128 welded to the center hub 110, and to and between the two web plates 120. The tooth members 130 thus span between the web plates 120 and are connected to the center hub by being welded to the web plates 120 and support plates 128.

The center hub 110 has a circumferential surface with a first diameter in its central section 112 and a second smaller diameter at the sides 114, forming a shoulder 116 at the intersection of the first and second diameters. While more than two web plates could be used, in the preferred embodiment two web plates 120 are used. Each web plate 120 has a central hole with a diameter 126 just larger than the second diameter of the sides 114 and smaller than the first diameter of the central section 112 of the center hub 110. In this fashion, the web plates 120 fit on the center hub 110 against the shoulders 116. Each web plate 120 has a plurality of recesses 122 and 124 around its perimeter, separated by supports 123. The tooth members 130 fit within the recess 122. The support plates 128 are welded to the center hub 110 and to and between the web plates 120. The number of support plates 128 is twice the number of tooth members 130. Each tooth member 130 is welded to two of the support plates 128. Each tooth member 130 comprises a main body fitting in one of the recesses 122 of each of the web plates, and a tooth section 132 extending radially outward for engaging and driving the track 50. The number of recesses 122 and 124 on each plate is twice the number of tooth members. The recesses 122 in which the tooth members fit are wider than the remainder of the recesses 124. The recesses 124 are used to allow dirt and mud to escape.

As best seen in FIGS. 10-16, each tooth member 130 comprises a main body having an extending tooth element 132 and shoulders 134 with a shoe contact surface 138. The tooth element 132 extends radially outward from the shoulder surface for fitting in a space between adjacent track shoes. The tooth element includes a driving surface 136 on both the front and back sides, so that the tumbler can drive the track in both directions. FIG. 16 shows the preferred shape of shoulders 134, having a generally round outer surface, but with two flat sections 138 having a width 139 where the shoulders contact the inside surfaces 58 of the track shoes 52. Line 107 has been added to FIG. 16 to show that in preferred embodiments the tangent of the surface that contacts the drive shoes will coincide with the flat section 138. The width 139 of the flat section is designed to allow sufficient surface contact for transmitting the tractive effort force for which the surface 138 is designed to transmit. However, the tractive effort is transmitted regardless of whether a flat area 138 is provided on the shoulder, so long as the shape of the shoulder (forming the rim of the tumbler) has a tangent line at the shoe contact surface that has a normal line that does not intersect the axis of rotation of the center hub.

A method of making the preferred drive tumbler 100 includes the steps of providing a center hub 110 and a plurality of individual tooth members 130; and connecting the individual tooth members 130 to the center hub 110 by welds to produce the drive tumbler, with teeth extending radially outward around the perimeter of the drive tumbler. Preferably, as noted above, two web plates 120 are welded to the center hub 110 adjacent the ends of the center hub 110 so as to extend radially outward, and the tooth members 130 are connected to the center hub 110 by being welded to the web plates 120. One of the real benefits of this method of construction is that the tooth members may be held in a fixture at a predetermined spacing from each other and welded to the web plates while in the fixture, thus providing a tumbler with more accurate tooth placement.

The crawler 14 is preferably equipped with a track tensioning system 150, best seen in FIGS. 5 and 20-24. As noted earlier, the crawler 14 has a frame 43. When discussing the track tensioning system, it is advantageous to discuss the orientation of the frame, particularly the bottom of the frame, as defined earlier. The crawler has at least one drive tumbler 100 supported on the frame. However, the present invention is particularly useful where the crawler has two drive assemblies 60, as shown in FIG. 5, one on the front of the crawler frame and one on the rear of the frame. Also, the preferred crawler will have two track tensioning systems that are identical to one another, but installed in left and right handed configurations. As noted earlier, the track 50 is made of a plurality of connected track shoes and has a ground engaging surface and an inside surface opposite the ground engaging surface. The track is wrapped around the drive tumbler so that a plurality of the shoes are in contact with the drive tumbler. The track also passes around the frame 43.

The track tensioning system 150 is mounted to the frame 43, preferably at the top of the frame. The track tensioning system 150 includes at least a first roller engaging the inside surface of the track; and a roller positioning structure attached to the frame that can raise the first roller relative to the bottom of the frame to thereby increase the tension of the track. The preferred roller positioning structure includes a first arm member 152 having a first end pivotally connected to the frame 43 and a second end supporting the first roller 162 (which is preferably made of two spaced rollers having a common axis of rotation), and a linear actuation device mounted between the frame and the first arm member 152. The preferred roller positioning structure further comprises a second arm member 154 having a first end pivotally connected to the frame 43 and a second end, and a link 156 having a first end pivotally connected to the first arm member 152 and a second end pivotally connected to a second arm member 154. The preferred roller positioning structure further comprises a second roller 164 (also preferably made of two spaced rollers) engaging the inside surface of the track, supported by the second arm member 154. The linear actuation device may preferably be a hydraulic cylinder 160. However, other linear actuation devices could be used as well, such as a rack and pinion drive or a worm gear drive. The first roller 162 rotates about a pin 165 that also pivotally connects the second end of the first arm member 152 to the hydraulic cylinder 160. The pin 165 also pivotally connects the second end of the first arm member 152 to the first end of the link 156. The second roller 164 rotates about a pin 167 that also pivotally connects the second end of the second arm member 154 to the second end of the link 156. The hydraulic cylinder 160 is preferably pinned to brackets 174 on the frame 43 with an axis of rotation aligned with the axis of rotation of the pivotal connection of the second arm member 154 to the frame, connected through brackets 176. Brackets 163 are used to pin the first arm member 152 to the frame 43.

The roller positioning structure preferably further comprises a holding structure that allows the roller positioning structure to maintain the first roller 162 in a selected position where it is in tensioning engagement with the track 50. In the embodiment depicted, the holding structure comprises a plurality of shims 170 that fit around the hydraulic cylinder rod. The rod has a connection end 161 connecting the rod to the remainder of the roller positioning structure, and a hydraulic cylinder housing 169. The shims 170 fit around the rod and between the hydraulic cylinder housing 169 and the rod connection end 161.

The method of tensioning the track uses the first roller and the roller positioning structure attached to the frame to raise the roller to engage the inside surface of the track. The roller is raised from a first position, shown in FIG. 23, to a second position, shown in FIG. 24. In the second position the roller is elevated with respect to the bottom of the frame compared to the first position, thus increasing the tension in the track. This is preferably accomplished by using an auxiliary hydraulic power source to extend the rod on hydraulic cylinder 160. Once a proper tension has been reached (which may be determined by various means, including by measuring the pressure in the hydraulic cylinder 160, or using a straight edge between the rollers 164 on the two tensioning systems 150 and measuring the sag in the track in a no-load condition), then shims 170 are placed around the rod between the hydraulic cylinder housing 169 and the rod connection end 161. Two bars 180, hinged to opposite sides of the rod connection end 161, may be used to secure the shims 170 in place by being locked into position through the recesses 171 and 173 on opposite sides of the shims 170. Thereafter the pressure can be released from the hydraulic cylinder 160. The shims should be made of a material that will not damage the rod of the hydraulic cylinder, but which can carry the very high compressive loads that will bear on the roller positioning structure when the track is under operational tension. Nylon and aluminum may be suitable for the shims if the shims have sufficient surface areas.

The crawler 14 is preferably equipped with a track connection system. The track connection system of the preferred embodiment uses portions of the track tensioning structure described above to also allow easy connection of the track 50. As shown in FIG. 25, when the track is being installed on the crawler frame 43, it will have first and second free ends 181 and 182 that connect together to form the track into an endless track 50. The first and second ends 181 and 182 are spaced apart, but each one is adjacent a section of the frame. The track connection system is mounted to the frame 43 and includes a mover device connected to the frame and a track engagement member coupled between the mover device and the track. Actuation of the mover device causes the track engagement member to move the track into a position where the first and second ends 181 and 182 can be connected. Preferably actuation of the mover device moves the first end of the track 181 towards the second end of the track 182, while an identical second track connection system mounted to the frame causes its track engagement member to move the second end of the track 182 towards the first end of the track 181.

Figure 27:
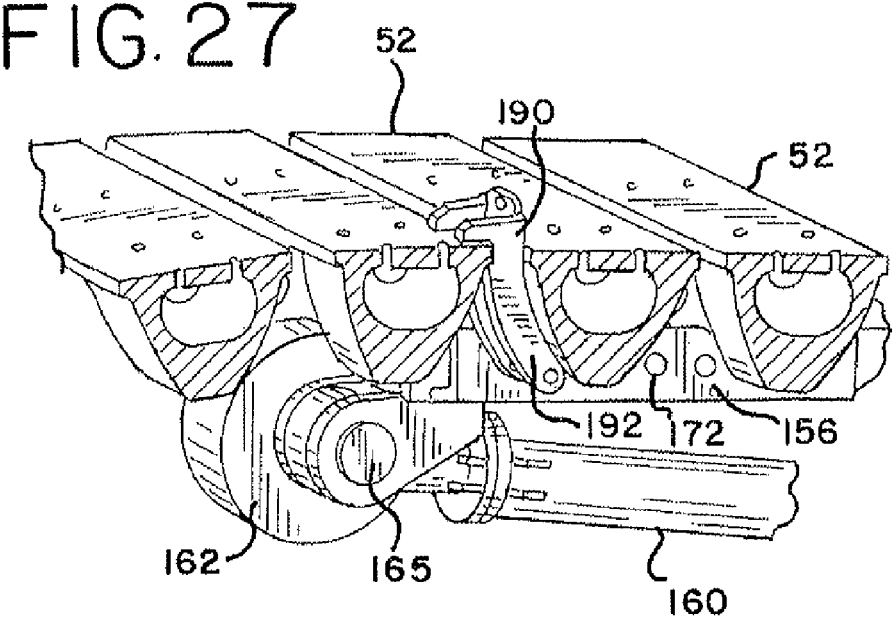
FIG. 27 is a partial cross-sectional view of a portion of the crawler of FIG. 25, showing the track engagement member located between track shoes.
Figure 28:
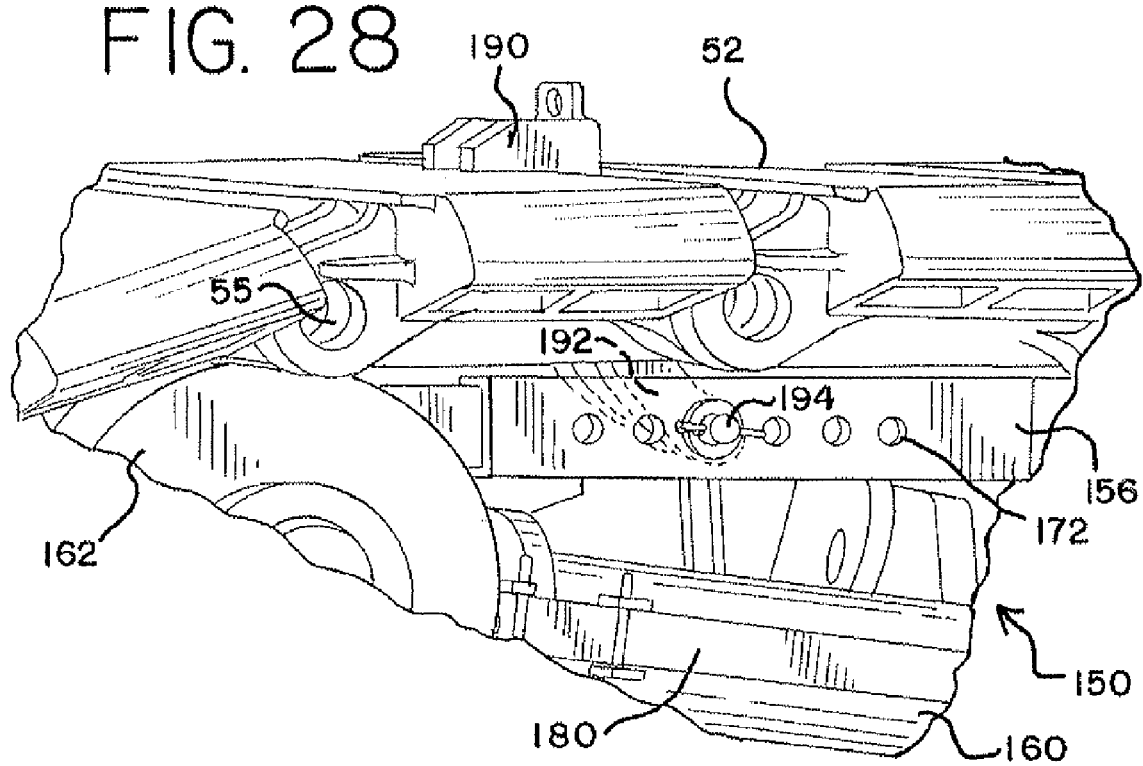
FIG. 28 is a perspective view of a portion of the crawler of FIG. 25, showing the track engagement member coupled between the mover device and the track.

As noted above, the preferred mover device uses the hydraulic cylinder 160 for power, although a rack and pinion drive or a worm gear drive could also be used. The mover device uses the first and second arm members 152 and 154, the link 156, and rollers 162 and 164, to engage the inside surface of the track. In addition, a track engagement member 190 is coupled between the link 156 and the track during the connection operation, as best seen in FIGS. 27 and 28. The track engagement member 190 preferably uses spaced apart arms 192 containing holes though which a pin 194 can be used to pin the engagement member 190 to the link 156. The link 156 preferably contains a series of holes 172 on each side of the link 156 so that the holes of the arms 192 will line up with one set of the holes 172 regardless of the position of the track with respect to the crawler frame 43.

The method of connecting the ends 181 and 182 of the track involves placing the frame 43 on the track while the track is lying on the ground. An assist crane is used to pick the ends of the track up and place them in the position adjacent the top of the frame while the hydraulic cylinders 160 are extended to the position shown in FIG. 25. The track engagement member is then placed between two adjacent track shoes and pin 194 is placed through one set of the holes 172 in link 156 and the holes in arms 192. The other track connecting system is connected to the other end of the track in the same manner. Preferably an auxiliary source of hydraulic power is used to release the brakes on the drive assemblies 60 so that the tumblers 100 can turn. Then the pressure is reversed on the hydraulic cylinders 160 (which are preferably double acting cylinders) and the cylinders retracted. The movement of the cylinders also moves the links 156, which cause the track engagement members 190 coupled between the mover device and the track, to move the track into a position where the first and second ends can be connected. After the track pin has been inserted to connect the ends 181 and 182, the pressure is removed from the hydraulic cylinders 160 to relieve the load on the engagement members 190 so that they can be removed from the track. Thereafter the track can be tensioned, as discussed above, and the shims put in place, as shown in FIG. 26.

The preferred embodiment of the present invention provides numerous advantages. The teeth on the tumbler and the lug on each track shoe can be reduced in size significantly because only a portion of the tractive effect force is transmitted through the engagement of the tooth and the lug. The construction of the tumbler has been changed from a one piece steel casting to a welded fabrication made tip of teeth castings, a center hub, and two web plates. The smaller, relatively simple tooth can be cast by numerous foundries, increasing manufacturing flexibility. The size, weight, and difficulty of the conventional tumbler such as the Model 18000 greatly limit the number of foundries. An individual cast tumbler tooth member 130 weighs 130 lbs. while a complete cast tumbler for the Model 18000 weighs 2,000 lbs. The individual tooth members can be fixtured in position prior to welding. When compared to a one piece tumbler casting such as the 18000, the teeth will be much more accurately positioned. The dual web design supports the tooth and rim on both sides, thus the track shoe is supported on both sides of the lug.

The preferred track tensioning system raises a roller in a motion that includes a vertical component. The roller positioning structure could move the roller vertically. However, the arrangement shown allows for sufficient track tensioning while the roller positioning structure is on the top part of the frame, rather than perhaps mounted inside of the frame, such as with a vertically acting hydraulic cylinder.

It should be understood that various changes and modifications to the presently preferred embodiments described herein will be apparent to those skilled in the art. For example, the tumblers could be made with recesses that include drive surfaces that engage the lugs on the track shoes, or the track shoes could be designed so that the teeth on the tumbler contact a different driven surface on the shoe rather than a lug. Further, the tumbler could be made of a center hub with the end plates cast all together as one casting, and the tooth members cast separately and welded in place. More importantly, the shoe contact surfaces on the rim of the tumbler providing a drive surface and the welded nature of the tumbler are independent of each other. A tumbler could be made using welded components that did not use the rim to transmit significant tractive force, and conventional one piece cast tumblers can be redesigned using the present invention to provide tractive force transmission through the rim of the tumbler. The track shoes may be made of multiple pieces, such as a chain with a ground engaging surface bolted to it. The tooth on the tumbler may then drive a link in the track chain rather than directly on the shoe. While generally rectangular crawler frames have been depicted, the crawler frame could be more triangular in shape. Such changes and modifications can be made without departing from the spirit and scope of the present invention and without diminishing its intended advantages. It is therefore intended that such changes and modifications be covered by the appended claims.

The invention claimed is:

1. A combination of a drive tumbler and a track comprising:
a) a track made of a plurality of connected track shoes each having a ground engaging surface and an inside surface opposite the ground engaging surface, the track further having a plurality of driven surfaces, the track being wrapped around the drive tumbler so that a plurality of the shoes are in contact with the drive tumbler; and
b) a drive tumbler having an axis of rotation, comprising:
i) a plurality of drive surfaces, at least one of which engages one of the driven surface on the track; and
ii) a circumferential rim surface that includes a plurality of shoe contact surfaces that each contact the inside surface of one of the track shoes that are in contact with the tumbler; wherein the shoe contact surface has a shape such that a line normal to the tangent of the shoe contact surface does not pass through the axis of rotation of the drive tumbler, thereby allowing the shoe contact surfaces on the rim of the drive tumbler to transmit a tractive force to the track.

2. The drive tumbler and track combination of claim 1 wherein the plurality of driven surfaces on the track are provided by a driven surface on each track shoe.

3. The drive tumbler and track combination of claim 2 wherein the driven surfaces on each of the track shoes is comprised at least in part by a lug extending inwardly from the inside surface of the track shoe.

4. The drive tumbler and track combination of claim 1 wherein the shoe contact surfaces on the drive tumbler rim are each shaped such that the line normal to the tangent of the shoe contact surface and a radius from the shoe contact surface to the axis of rotation intersect at an angle of between about 5° and about 18°.

5. The drive tumbler and track combination of claim 1 wherein the plurality of drive surfaces comprise drive teeth extending outwardly around the periphery of the drive tumbler.

6. The drive tumbler and track combination of claim 5 wherein the circumferential rim comprises two shoulders, one on each side of the drive teeth, each shoulder comprising a set of said shoe contact surfaces.

7. The drive tumbler and track combination of claim 1 wherein the drive tumbler comprises a center hub and a plurality of individual tooth members connected to the center hub by welds.

8. The drive tumbler and track combination of claim 7 wherein the drive tumbler further comprises two web plates; and a plurality of support plates welded to the center hub, and to and between the at least two web plates; and the tooth members span between the web plates and are connected to the center hub by being welded to the web plates and support plates.

9. A lift crane comprising a plurality of crawlers wherein each crawler comprises a crawler frame and the drive tumbler and track combination of claim 1.

10. A method of transmitting force between a drive tumbler and a track wherein the track is made from a plurality of connected track shoes each having a ground engaging surface, an inside surface opposite the ground engaging surface and a driven surface, the track being wrapped around the drive tumbler so that a plurality of the shoes are in contact with the drive tumbler; and wherein the drive tumbler has an axis of rotation, a plurality of drive surfaces, at least one of which engages the driven surface on one of the track shoes that are in contact with the tumbler, and a circumferential rim surface that includes a plurality of shoe contact surfaces that each contact the inside surface of one of the track shoes that are in contact with the tumbler, the shoe contact surfaces each having a shape such that a line normal to the tangent of the shoe contact surface does not pass through the axis of rotation of the drive tumbler; the method comprising applying torque through the drive tumbler to the track through both i) the drive surface of the tumbler contacting the driven surface on the track shoes, and ii) the shoe contact surfaces on the rim contacting the inside surfaces of the shoes; the torque applied by the drive tumbler shoe contact surfaces on the rim of the tumbler having a moment arm about which to generate force on the track from the contact of the shoe contact surfaces on the rim.

11. The method of claim 10 wherein the ratio of i) the force generated by the contact of the drive surface with the driven surface and ii) the force generated by the contact of the shoe contact surfaces on the rim and the inside surfaces of the track shoes is less than 3:1.

12. A drive tumbler for a track vehicle comprising:
   a) a center hub having an axis of rotation; and
   b) a plurality of tooth members individually connected to the center hub by welds;
   c) at least two web plates welded to the center hub, wherein each respective tooth member of the plurality of tooth members span between the at least two web plates and are connected to the center hub by being welded to the at least two web plates; and
   d) support plates welded to the center hub and to and between the at least two web plates.

13. The drive tumbler of claim 12 wherein the center hub has a circumferential surface with a first diameter in its central section and a second smaller diameter at the sides, forming a shoulder at the intersection of the first and second diameters, and the at least two web plates comprise two web plates, each one having a central hole with a diameter larger than the second diameter and smaller than the first diameter, and fit on the center hub against said shoulders.

14. The drive tumbler of claim 12 wherein the number of support plates is twice the number of tooth members, and each tooth member is also welded to two of said support plates.

15. The drive tumbler of claim 12 wherein each web plate comprises a plurality of recesses around its perimeter, and each respective tooth member fits within a respective recess of said plurality of recesses.

16. The drive tumbler of claim 15 wherein each tooth member comprises a main body fitting in one of the recesses of each of the web plates, and a tooth section extending radially outward for engaging and driving a track.

17. The drive tumbler of claim 15 wherein the number of recesses on each plate is twice the number of tooth members.

18. The drive tumbler of claim 17 wherein the recesses in which the tooth members fit are wider than the remainder of the recesses.

19. A combination of a drive tumbler of claim 12 and a track made of a plurality of connected track shoes to make an endless track having a ground engaging surface and an inside surface opposite the ground engaging surface, the track being wrapped around the drive tumbler so that a plurality of the shoes are in contact with the drive tumbler; wherein each tooth member comprises a main body having a shoulder with a shoe contact surface, and a tooth extending radially outward from the shoulder surface for fitting in a space between adjacent track shoes.

20. The combination of claim 19 wherein the shoe contact surface has a shape such that, for the tooth members that are in contact with a track shoe, a line normal to the tangent of the surface at the place of contact with the track does not pass through the axis of rotation of the center hub, thereby allowing the shoe contact surface to transmit a tractive force to the track.

21. A method of making a drive tumbler for a track vehicle comprising:
   a) providing a center hub, at least two web plates, a plurality of support plates and a plurality of individual tooth members;
   b) welding the at least two web plates to the center hub;
   c) welding the support plates to the center hub and to and between the at least two web plates; and
   d) connecting the tooth members individually to the center hub by welds to produce said drive tumbler, wherein each respective tooth member of the plurality of tooth members span between the at least two web plates and are connected to the center hub by being welded to the at least two web plates with the tooth members extending radially outward around the perimeter of the drive tumbler.

22. The method of claim 21 wherein the at least two web plates comprise two web plates and the two web plates are welded to the center hub adjacent ends of the center hub so as to extend radially outward.

23. The method of claim 22 wherein the tooth members are held in a fixture at a predetermined spacing from each other and welded to the web plates while in said fixture.

24. The method of claim 22 wherein the center hub has a circumferential surface with a first diameter in its central section and a second smaller diameter at the sides, forming a shoulder at the intersection of the first and second diameters, and each web plate has a central hole with a diameter larger than the second diameter and smaller than the first diameter, and the web plates are placed on the center hub against said shoulders and welded in place.

* * * * *